United States Patent
Kocherry et al.

(10) Patent No.: US 8,356,119 B2
(45) Date of Patent: Jan. 15, 2013

(54) PERFORMANCE BY REDUCING TRANSACTION REQUEST ORDERING REQUIREMENTS

(75) Inventors: Mittu Xavier Kocherry, Cambridge (GB); Antony John Penton, Cambridge (GB); Simon John Craske, Cambridge (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 12/662,625

(22) Filed: Apr. 26, 2010

(65) Prior Publication Data

US 2011/0264827 A1    Oct. 27, 2011

(51) Int. Cl.
*G06F 3/00*    (2006.01)
(52) U.S. Cl. .......................................... 710/15; 710/16
(58) Field of Classification Search ................. 710/15, 710/16
See application file for complete search history.

(56) References Cited

U.S. PATENT DOCUMENTS

| | | | |
|---|---|---|---|
| 7,107,371 B1 * | 9/2006 | Bell .............................. | 710/104 |
| 2003/0115013 A1 * | 6/2003 | Dendinger .................... | 702/132 |
| 2009/0198893 A1 * | 8/2009 | Sorgard et al. ................ | 711/118 |
| 2011/0022802 A1 * | 1/2011 | Arsanto et al. ................ | 711/122 |

* cited by examiner

*Primary Examiner* — Chun-Kuan Lee
*Assistant Examiner* — Ronald Modo
(74) *Attorney, Agent, or Firm* — Nixon & Vanderhye P.C.

(57) ABSTRACT

A data processing apparatus is disclosed that is configured to communicate via an output port with a plurality of devices and to issue a stream of transaction requests to the output port, the stream of transaction requests comprising at least some device transaction requests destined for the plurality of devices. Device transactions are transactions that may affect each other and therefore should be completed in an order in which they are received at the output port in. The output port is configured to output the received transaction requests as a single serial stream of transaction requests. The data processing apparatus comprises: a destination device detector for monitoring the device transaction requests and for determining which of the plurality of devices each of the device transaction requests are destined for; the output port comprises ordering circuitry configured to treat the plurality of devices as at least two subsets of devices, at least one of the subsets comprising at least two devices; the ordering circuitry being configured to receive the stream of transaction requests and to classify each of the device transaction requests into one of the at least two subsets in response to determination of a destination device by said destination device detector, and to maintain said order that said device transaction requests within each subset are received in, such that device transaction requests within each subset are output by the output port and executed by their respective destination devices in the received order, while device transaction requests within different subsets may be output in an order that is different to the received order.

20 Claims, 6 Drawing Sheets

PERFORMANCE BY REDUCING TRANSACTION REQUEST ORDERING REQUIREMENTS

TECHNICAL FIELD

The field of the invention relates to data processing and in particular to transmitting transactions between interconnected devices while retaining the required ordering of the transactions.

BACKGROUND

Interconnects for connecting masters with slaves so that a CPU for example can access memory and various peripheral devices are known. These interconnects have there own protocols which allow logic within them to deal with and route transaction requests appropriately.

Some systems use memory mapped input/output where the same address bus is used to address both memory and input/output devices and CPU instructions used to address memory are also used to access the devices. In such cases a certain region of memory needs to be reserved for these devices, the code of the CPU instruction or the value of the register used by the instruction then being an indication of the device to be accessed.

In memory mapped systems peripheral devices are mapped to a shared device memory region and the system is designed so that the ordering of transactions sent to these devices is maintained to avoid data coherency problems. Thus, the protocol of the interconnect is designed to ensure that a transaction to this shared memory region that is received after another transaction to the same region does not execute before it.

Satisfying this ordering requirement has been addressed in the prior art, for example in the ARM® AXI bus protocol by marking transaction requests to devices mapped to this address space with a "device" attribute. The AXI protocol then imposes an ordering requirement on these transaction requests requiring them to execute in the order that they are received in. Thus, if the same bus can access two devices mapped to the same address space, the AXI protocol enforces ordering requirements of transaction requests marked with the device attribute on this bus. Alternatively, separate buses may be used to access each of the different devices.

Both solutions to the problem have drawbacks. The use of different buses is expensive in interconnect hardware, while sharing a bus, but using bus logic to enforce the ordering requirements has a drawback where several peripheral devices are mapped to this memory region in that a slow peripheral device that takes a long time to execute a transaction request can hold up many other peripheral devices. This can be a particular problem if one of these peripheral devices needs to perform an action with low latency which is the case for an interrupt controller for example.

It would be desirable to be able to reduce the delays caused by these ordering requirements without unduly increasing the interconnect hardware used.

SUMMARY

A first aspect provides a data processing apparatus for processing data, said data processing apparatus being configured to communicate via an output port with a plurality of devices and to issue a stream of transaction requests to said output port, said stream of transaction requests comprising at least some device transaction requests destined for said plurality of devices, device transactions being transactions that may affect each other and therefore should be completed in an order in which they are received at said output port in, said output port being configured to output said received transaction requests as a single serial stream of transaction requests, said data processing apparatus comprising: a destination device detector for monitoring said device transaction requests and for determining which of said plurality of devices each of said device transaction requests are destined for; said output port comprising ordering circuitry configured to treat said plurality of devices as at least two subsets of devices, at least one of said subsets comprising at least two devices; said ordering circuitry being configured to receive said stream of transaction requests and to classify each of said device transaction requests into one of said at least two subsets in response to determination of a destination device by said destination device detector, and to maintain said order that said device transaction requests within each subset are received in, such that device transaction requests within each subset are output by said output port and executed by their respective destination devices in said received order, while device transaction requests within different subsets may be output in an order that is different to said received order.

The inventors recognized that some interconnect circuitry recipient devices may be grouped together and their transactions marked as requiring ordering with respect to each other. However, they also recognized that although many recipient devices may be grouped in this way, their properties are such that some of them may not interact with each other. Thus, the very general ordering requirement that is imposed on all recipient devices within this group or set can in some instances be alleviated by dividing this group into subsets, wherein it is determined that the subsets should have their transactions ordered with respect to other devices within the subset but not with respect to transaction requests to recipient devices not within the subset.

This subdivision of the set of recipient devices that need transaction requests ordered with respect to each other, can considerably reduce the delay that these ordering requirements give to execution of these transaction requests.

In some embodiments the system designer designs the system so that certain of these recipient devices act completely independently of others and they can then be put into different subsets and they then no longer need to await completion of transactions to devices in other subsets and the latency of the system can be reduced. Thus, at the design stage the ordering requirements of devices that are within a set are reduced by subdividing the set into subsets. Although this has the potential to reduce the latency of the system, care must be taken to ensure that the devices in different subsets are indeed independent of devices in other subsets, otherwise the system may not operate correctly. A destination device detector within the apparatus then detects which device a device transaction request is destined for and ordering circuitry determines from this which subset the destination device is in, and ensures that the output port outputs the transactions, so that the required ordering of the different subsets is maintained. In this way a single serial output stream outputs two subsets of transaction requests, that have ordering requirements within themselves but not with each other. In effect the output port could be seen to be acting as two virtual ports, each transmitting transaction requests to a different subset of devices.

In some embodiments, said destination device detector is configured to detect said destination of said device transaction request from an address associated with said request, each of said at least two subsets being identified by a plurality of addresses.

Where a system is a memory mapped system, then devices may be mapped to a particular memory region and in such a case transactions to an address within this region are known to be transactions to one of the devices. Thus, a set of recipient devices consists of recipient devices mapped to a same memory region. This set can be subdivided based on a knowledge of which devices have been configured to operate independently with respect to each other, and the devices within the different subsets are then mapped to different memory regions, these different regions being identified by different addresses, and transactions to different subsets of devices do not need to be ordered with respect to each other.

In some embodiments said output port communicates with said plurality of devices via a bus configured to transmit transaction requests one after the other in series.

The output port outputs transaction requests as a serial stream of transaction requests and in some embodiments they are output to a bus, which transmits the transaction requests as a serial stream to the plurality of devices.

In some embodiments, device transaction requests each comprise a device indicator indicating that said transaction request is one of said device transaction requests, said destination device detector being configured to classify said device transaction requests into said at least two subsets and to add a further indicator to said device transaction request identifying said subset, said ordering circuitry being configured to maintain an ordering of said device transaction requests within said subsets.

Although the division if the device transaction requests into subsets can be done in a number of ways, in some embodiments it is done by adding a further indicator to the transaction request. Thus, the device transaction requests have an indicator indicating that they are device transaction requests and a further indicator indicating which subset they belong to and thus, which other transaction requests they need to be ordered with respect to.

In some embodiments, said transaction requests each comprise an attribute indicator, said attribute indicator comprising one of the following: a normal indicator indicating said transaction request has no ordering requirements with respect to other transaction requests; a strongly ordered indicator indicating said transaction request has ordering requirements with respect to all transaction requests; and a device indicator indicating that said transaction request is one of said device transaction requests to one of said plurality of devices and that said device transaction request has ordering requirements with respect to other device transaction requests; said ordering circuitry being responsive to detection of said device transaction requests to classify said device transaction requests into said at least two subsets and to maintain said ordering within said subsets.

In some embodiments, there are different ordering requirements that can be associated with different transactions, these different ordering requirements being set to ensure correct operation of the apparatus. These different ordering requirements are identified by attribute indicators so that the ordering circuitry can determine from the transaction request how it should be treated.

The ordering circuitry is configured so that transaction requests with a strongly ordered indicator are ordered with respect to all transaction requests such that the ordering circuitry does not allow these to be transmitted further until all outstanding transaction requests have been completed. Furthermore, no transaction request is allowed to be transmitted following the strongly ordered transaction request until it has completed.

Transaction requests with a normal attribute indicator can be transmitted further where there is sufficient capacity and they do not need to wait for completion of any earlier transaction requests except for pending strongly ordered transaction requests, which as mentioned above have to finish before any further transaction requests can be sent. Transaction requests with a device indicator require ordering with respect to other device transaction requests in a same subset, and thus, await completion of pending transaction requests in the same subset, but can progress further if there are pending transaction requests in a different subset.

In some embodiments, said ordering circuitry comprises buffer circuitry for storing pending transaction requests prior to outputting said transaction requests at said output port.

In order to ensure the transaction requests are maintained in the correct order, buffer circuitry can be used to store pending transaction requests until it is safe to transmit them further, for example when all transaction requests that must complete before they complete have completed. This buffer circuitry is associated with the ordering circuitry which uses it to ensure that pending transaction requests that should not yet be executed are held somewhere.

In some embodiments, said buffer circuitry comprises a plurality of buffers arranged in parallel with each other, at least two of said plurality of buffers being configured to store pending transaction requests from corresponding ones of said at least two subsets of device transactions.

The buffer circuitry can be arranged as parallel buffers to store queues of transaction requests. Thus, there may be individual buffers for the particular subsets of transaction requests and in this way they are output in the desired order, the timing of their output being controlled by the ordering circuitry.

The buffer circuitry has a certain size and thus, it may have a counter associated with it, then if there are many pending transactions stored in the buffer the interconnect circuitry can respond to the count value reaching a predetermined value not to transmit further transactions to that buffer as these further transactions would cause an overflow of the buffer.

Having buffer circuitry with a counter associated with it allows pending transactions to be queued and prevents the buffer overflowing. As the set of recipient to devices are divided into subsets there will be fewer transactions queued. Thus, these counters can be smaller and indeed the buffer circuitry can be smaller than in a system with no subsets and this saves on area required for the system when compared to a system where the plurality of devices is not subdivided.

In some embodiments, said plurality of devices comprise at least two of: at least one memory, at least one peripheral device and at least one interrupt controller; and said at least one peripheral device and said at least one interrupt controller, are within different subsets.

The devices are slave devices and may include a memory, an interrupt controller or indeed any sort of peripheral.

In some embodiments, it is advantageous if the interrupt controller is within a different subset of devices to many of the other peripheral devices. It is particularly advantageous to place an interrupt controller in a different subset to any peripherals with long latency times. This helps avoid the interrupt controller being held up by transaction requests to slower peripherals waiting to complete.

In some embodiments said plurality of devices are recipient devices are mapped to a memory region dedicated to said plurality of devices.

Where a system is a memory mapped system, then devices may be mapped to a particular memory region and in such a case transactions to an address within this region are known to be transactions to one of the devices. These transactions may be interdependent and as such are ordered with respect to each other. Thus, a set of devices consists of devices mapped to a same memory region. This set can be subdivided based on a knowledge of which devices have been configured to operate independently with respect to each other, so that their transactions do not need to be ordered with respect to each other.

A second aspect provides, a system comprising a data processing apparatus according to the first aspect, a plurality of devices and interconnect circuitry for providing data paths between said data processing apparatus and said plurality of devices.

A third aspect provides a method of routing transaction requests generated by a data processing apparatus to a plurality of devices, said transaction requests being output from said data processing apparatus via an output port, said output port being for outputting a single serial stream of transaction requests, said method comprising the steps of: issuing a stream of transaction requests generated by said data processing apparatus to said output port said stream of transaction requests comprising at least some device transaction requests destined for said plurality of devices, device transactions being transactions that may affect each other and therefore should be completed in an order in which they are received at said output port in; monitoring said device transaction requests using a destination device detector and determining which of said plurality of devices each of said device transaction requests are destined for; ordering said transaction requests using ordering circuitry configured to treat said plurality of devices as at least two subsets of devices, at least one of said subsets comprising at least two devices, by classifying each of said device transaction requests into one of said at least two subsets in response to said determining step and maintaining said order that said device transaction requests within each subset are received in, such that device transaction requests within each subset are output by said output port and executed by their respective destination devices in said received order, while device transaction requests within different subsets may be output in an order that is different to said received order; and outputting said transaction requests as a single serial stream of transaction requests at said output port.

A fourth aspect provides data processing means for processing data, said data processing means being configured to communicate with a plurality of devices via an output means for outputting transaction requests as a single serial stream, and to issue a stream of transaction requests to said output means, said stream of transaction requests comprising at least some device transaction requests destined for said plurality of devices, device transactions being transactions that may affect each other and therefore should be completed in an order in which they are received at said output means in, said data processing means comprising: a destination device detecting means for monitoring said device transaction requests and for determining which of said plurality of devices each of said device transaction requests are destined for; said output means comprising ordering means configured to treat said plurality of devices as at least two subsets of devices, at least one of said subsets comprising at least two devices; said ordering means being configured to receive said stream of transaction requests and to classify each of said device transaction requests into one of said at least two subsets in response to determination of a destination device by said destination device detecting means, and to maintain said order that said device transaction requests within each subset are received in, such that device transaction requests within each subset are output by said output means and executed by their respective destination devices in said received order, while device transaction requests within different subsets may be output in an order that is different to said received order.

DESCRIPTION OF EXAMPLE EMBODIMENTS

Figure 1:
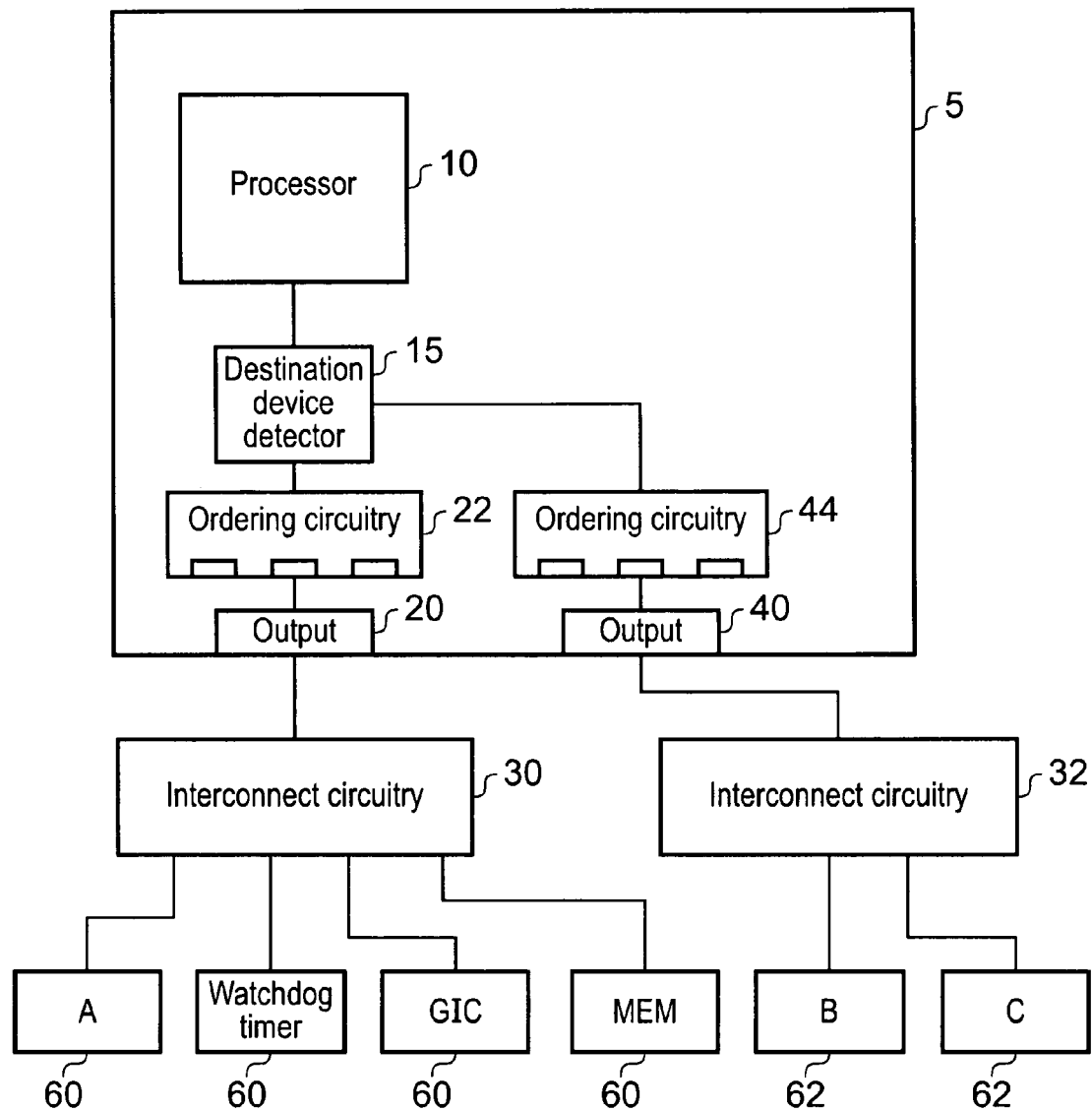
FIG. 1 shows a data processing apparatus including the interconnect circuitry of an example embodiment.

FIG. 1 shows a data processing apparatus 5 according to an example embodiment. This data processing apparatus 5 has a processor 10 that acts as a master in the system and communicates via output port 20 and interconnect circuitry 30 with a plurality of slave devices 60 which include a peripheral A, a memory, a general interrupt controller (GIC), and a watchdog timer. It also communicates with a further output port 40 and interconnect circuitry 32 with further slave devices peripherals 62 B and C.

The system is a memory mapped system so that the various devices are mapped to a particular region within the memory. In this way the processor 10 can determine from the address of a transaction whether it is to a device, dependent on whether the address of the transaction is an address within this particular "device" memory region.

Figure 2:
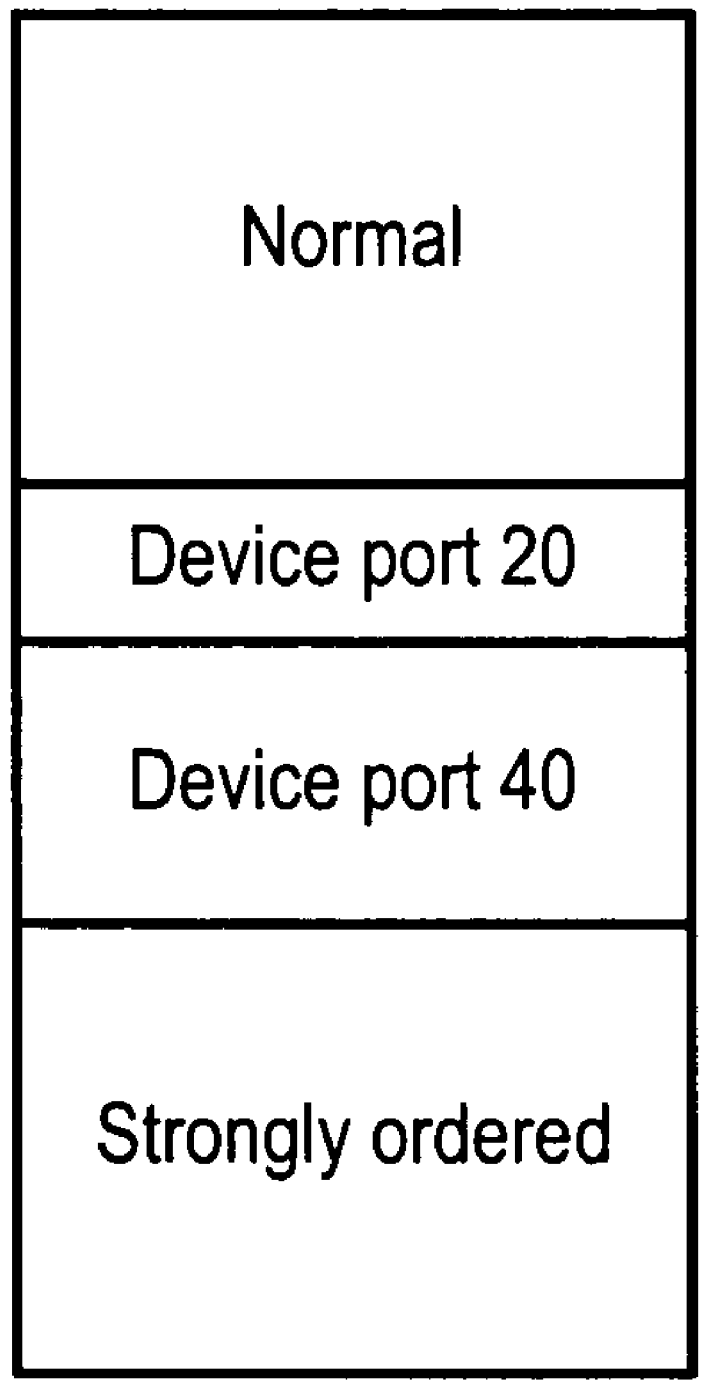
FIG. 2 shows memory mapped regions within a memory of a memory mapped system.

FIG. 2 shows in schematic form how the memory regions are set out in one example embodiment. In this embodiment there is a region that is marked as normal and transactions with addresses within this region do not need to be ordered with respect to other transactions (except for strongly ordered transaction requests). Thus, when a processor determines from an address that it is accessing this region of memory it sets an attribute associated with the transaction to "normal" and the ordering circuitry knows that the transaction does not need to be ordered with respect to other transactions.

If a transaction received has an address that is in the device region of the memory then the processor will mark it with the device attribute and then further logic will understand that all transactions within the device region need to be ordered with respect to each other.

Destination device detector 15, can determine which device the transaction request is destined for from the address of the transaction request and from a knowledge of the different subsets can add a further ID indicator to the transaction request indicating the subset of devices that the transaction request is destined for.

If a transaction is to an address within the strongly ordered region of the memory then this is marked with the strongly ordered attribute and then logic downstream in the system knows that these transactions must retain the ordering that they have with respect to all other transactions.

Thus, when output port 20 receives transactions from processor 10 it can determine from the attributes associated with the transactions what ordering they require. Thus, ordering circuitry 22 within output port 20 can ensure that the correct ordering is retained.

In this particular embodiment, the device region in the memory is split into two regions, device port 20 and device port 40. This system has been set up so that devices mapped to device port 20 are tied to this port and so are always accessed via this port, while devices mapped to port 40 are always accessed via device port 40. Thus, processor 10 is configured to send transactions to addresses within device port 40 region to port 40 and those to addresses within device port 20 region to port 20. Transactions to addresses within device port 20 region and those to addresses within device port 40 region do not need to be ordered with respect to each other, although they do need to be ordered with respect to other transactions within their particular device port region.

Dividing the memory "device" region in this way allows the recipient devices to be formed into subsets so that transactions sent via one port do not affect transactions sent via the other. Although this has advantages from the latency point of view, it clearly has significant area overheads as an extra port is required.

As can be seen transactions to devices within the same device region of memory may be interdependent and thus, there transactions need to be ordered with respect to each other. However, although this is generally true, the system can be configured so that some of these devices do act independently of each other. This may be easy to do with certain peripheral devices that in fact would not usually interact with other peripheral devices. Thus, a designer designing the system can configure it so that certain of the devices act independently of each other and thus, their transactions do not need to be ordered with respect to each other. In order for the ordering logic 22 within port 20 to understand that this is the case, a further field is used within the transaction, the ID field. Thus, destination device detector 15 is configured to detect from the address of the transaction which subset of devices the transaction request is destined for and to add an ID field to the device transaction requests indicating this subset. Thus, the designer may design the general interrupt controller to be in a small subset of peripherals so that transactions to this controller are not affected by transactions to many other peripherals. Thus, where devices are in different subsets they are given different ID fields and the ordering logic will then order the transactions so that transactions with the same ID field are ordered with respect to each other but transactions with different ID fields are treated independently.

In this way, the ordering requirements are reduced by subdividing the sets of transactions that need to be ordered with respect to each other into subsets and the latencies of the system are thereby reduced. Clearly the more subsets that the set can be divided into the lower the latency of the system, however it may not be easy to divide the system into too many subsets as some of the peripherals will naturally be dependent on each other. Thus, the system designer will select the appropriate subsets depending on the circumstances.

Independent subset of devices may be formed for any one or all of the output ports depending on the nature of the devices that they connect to.

In order for the ordering circuitry 22 and 44 to control the output of the transaction requests via their respective output ports 20 and 40, they have buffering circuitry within them. This is shown in FIG. 3.

Figure 3:
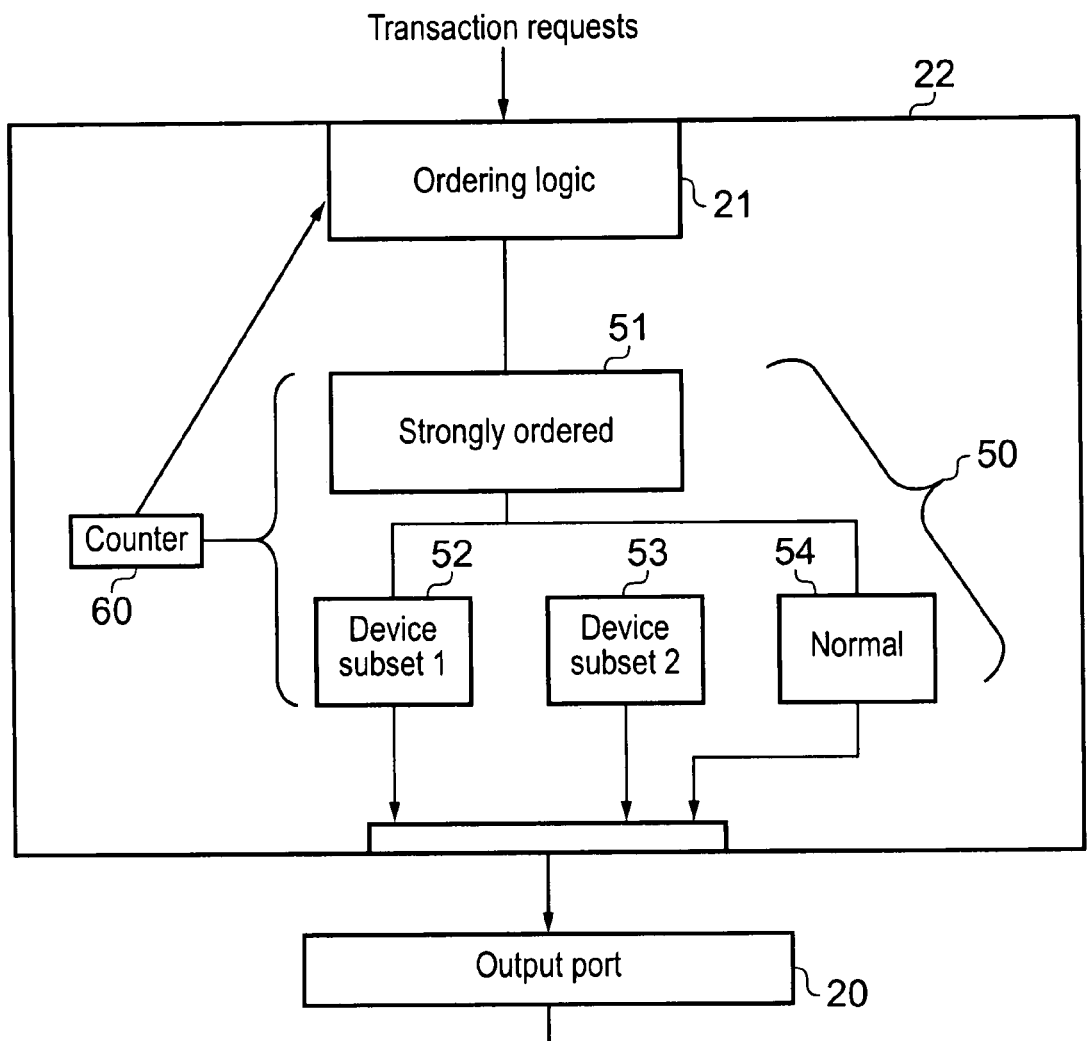
FIG. 3 shows an output port of an example embodiment.

FIG. 3 shows how buffering circuitry 50 within ordering circuitry 22 stores different queues of transaction requests prior to outputting them to output port 20. In this embodiment, buffering circuitry 50 has four buffers, buffer 51 stores strongly ordered transactions, buffer 52 transactions to one subset of device transactions and buffer 53 to another subset, and buffer 54 stores pending normal transaction requests.

There is a counter 60 associated with the buffer circuitry 50 that indicates to ordering logic 21 when any of the buffers 51, 52, 53 or 54 are full, in response this ordering logic 21 inhibits further transaction requests from being received by sending a stall signal to the processor 10 until there is space in the buffers again.

The individual buffer counters within counter 60 are incremented when a transaction request is transmitted to a buffer and decremented when the transaction request is transmitted from the buffer. When a counter attains a predetermined value, transaction requests are no longer transmitted to the buffer associated with the counter, as it is at this point full. When the counter is decremented then transactions can be sent again.

In some embodiments, there are buffers within the interconnect and perhaps within individual devices, in these cases a predetermined value that the counter can reach before it indicates that it is full and can accept no further transaction requests reflects this additional storage capacity. Furthermore, in this case, the counter is decremented in response to a response signal indicating a transaction has completed.

With regard to the ordering circuitry of FIG. 3, a stream of transaction requests are received from processor 10 and ordering logic 21 determines from the attributes and ID field associated with the transaction requests what their ordering requirements are with respect to each other. They are then stored in a particular buffer in dependence upon their ordering requirements. In the case of a transaction request with a normal attribute, this only needs to wait for any currently pending strongly ordered transactions to complete. If there are no currently pending strongly ordered transactions then this transaction can go when there is, availability on the bus. Thus, these form their own queue and are placed in a separate buffer 54 that communicates with the output and sends transactions when there is capacity on the bus 30 and no pending strongly ordered transactions. Transactions with a device attribute need to wait both for strongly ordered transactions and for other device attribute transactions having a same ID field to complete before they themselves can be transmitted. Thus, they are placed in queues within their own buffers 52, 53 depending on their ID field or subset. Strongly ordered transactions requests cannot go until all the transaction requests before them have been completed, furthermore, no transactions following the strongly ordered transactions can proceed until the strongly ordered transaction has completed and thus, they are stored in a separate buffer 51. Thus, in the case that a output port receives a strongly ordered transaction request this is not transmitted further until all the buffers 52, 53, 54 holding pending requests have drained. The strongly ordered transaction is then sent further and no other transactions are allowed to proceed until it has completed. In some embodiments this behaviour is ensured by stalling receipt of further transactions until the strongly ordered transaction request has itself completed whereupon further transaction requests can once again be received.

Figure 4:
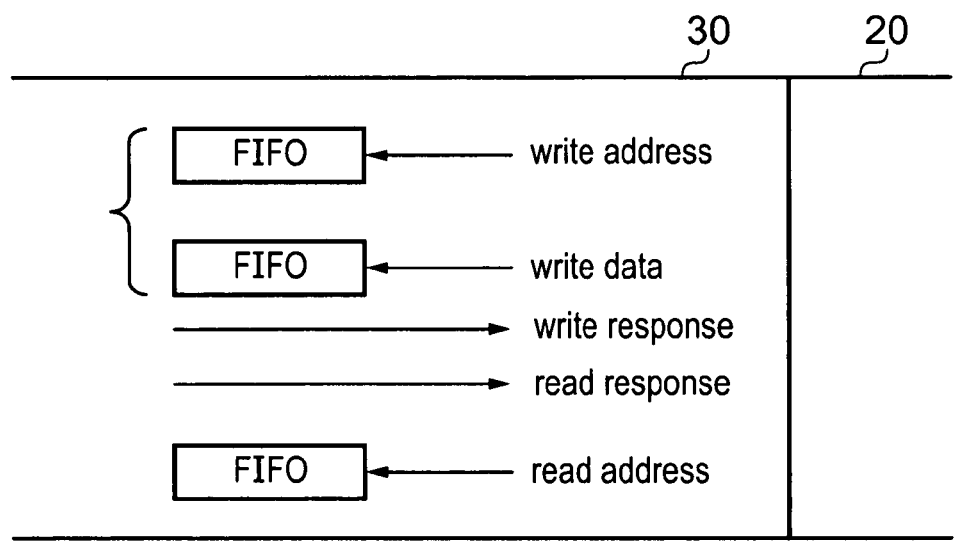
FIG. 4 shows a bus with buffer circuitry.

Interconnect circuitry 30 may take the form of a bus, and this is shown in FIG. 4. This bus 30 is connected to output port 20 and in this embodiment is an AXI bus produced by ARM® of Cambridge, United Kingdom. This bus has multiple channels, it has write channels and read channels, the write channels being a write address channel, a write data channel and a write response channel. The read channels comprise a read address channel and read response channel which transmits the read data. The write channels and the read channels have buffers in this embodiment so that when a write transaction request is transmitted to the bus 30 the write address and the write data information can be buffered within the bus if the peripheral they are being sent to is not ready. Once the write has completed the peripheral will send back a write response indicating that it has completed that request. There is a separate read channel where a read address can be sent and buffered and a read response can be sent. In general program execution the order of certain instructions must be respected irrespective of the attribute of the transaction. In particular, a write cannot be allowed to overtake a read to the same address, similarly a read shouldn't overtake a write, if either of the above happen then the system does not work. Generally reads are blocking so that once a read has issued no further transaction will be issued until the read has completed, so there is no potential problem here. However, for the device regions of a read after write can present problems. If these operations are to the same address then they will not be allowed to be reordered with respect to each other by standard protocols, if however, they are to different addresses in the same device region of memories then standard protocols will not prevent reordering, and yet reordering may cause problems. In example embodiments, read transactions with a device attribute that are in the same subset as and are following in program order to a write transaction need to retain this ordering. Thus, if a write to one of the devices within the subset has been sent, a read cannot be sent until a response has been received. In effect a read cannot be sent to any of the devices within that subset until all of the writes to those devices that are pending have completed. However, a read for a device in a different subset could be sent while the writes to the other subsets are pending as there are no ordering requirements between subsets. Similarly, writes or reads with normal attributes can be sent whenever there is bus availability and can sit in the buffers on the bus while strongly ordered transaction requests cannot be sent until all of the buffers are empty and response signals have been received to all pending transactions.

Figure 5:
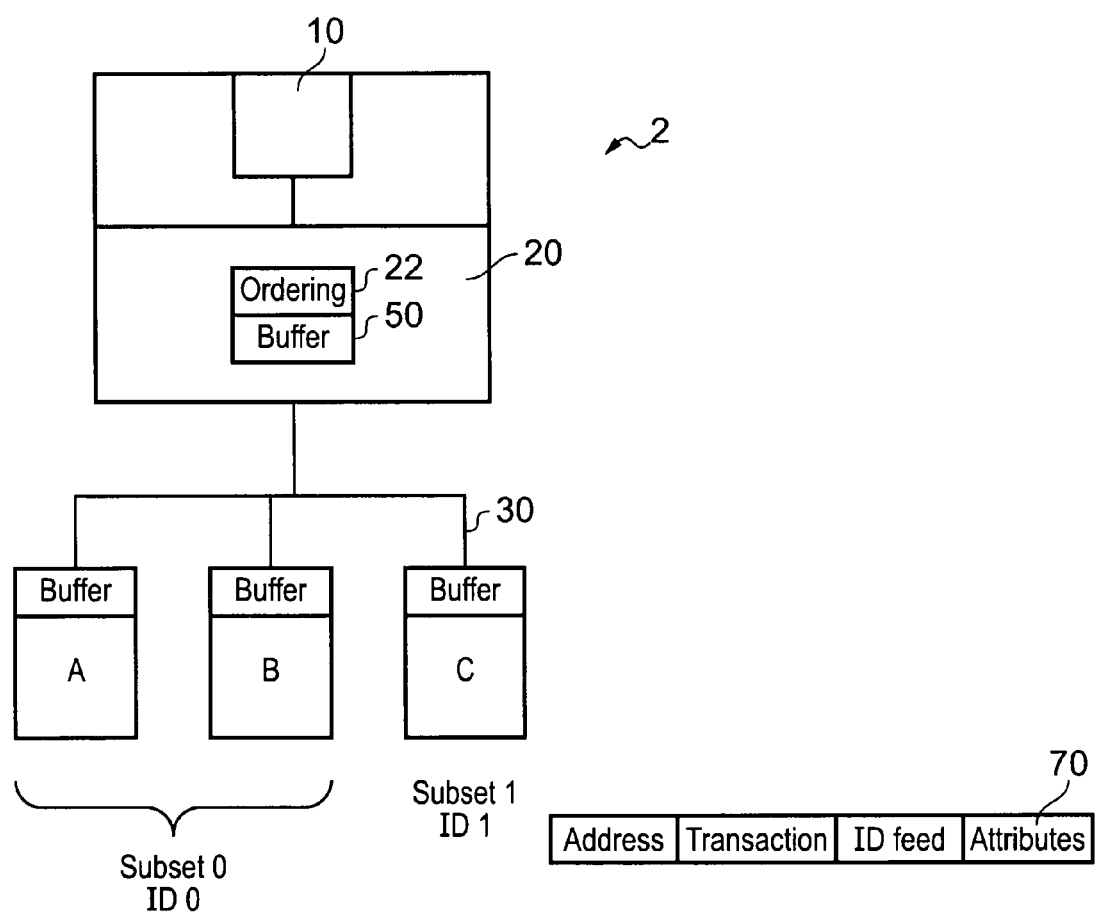
FIG. 5 shows a system according to an example embodiment.

FIG. 5 shows schematically a system 2 according to a further example embodiment. In this embodiment processor 10 communicates via an output port 20 with bus 30 which communicates with various peripherals A B and C. Peripherals A and B are grouped together in one subset with an ID field of 0 while C is in a different subset with an ID field of 1. Transactions 70 with device attributes to either of peripherals A and B have no ordering requirements with respect to transactions to peripherals C. This is similar to transactions to devices that are tied to a particular port and thus, one way of looking at transactions to these subsets of devices is to view these devices as being tied to virtual ports 0 and 1, these virtual ports hanging off output port 20. An example of a transaction request is shown, this has an address field giving a target address, a transaction field indicating the type of transaction, an attribute field indicating if it is a device, normal or strongly ordered transaction and an ID field which is used to identify the subsets of device transaction requests.

In this embodiment, there is buffer circuitry 50 within output port 20 to queue pending transaction requests and there are also buffers on the peripherals A, B and C to store transaction requests that have not yet completed. These buffers similar to the buffers within the bus in FIG. 4 allow pending transaction requests to be stored while awaiting completion. Thus, normal transaction requests to peripheral A can be transmitted whenever there is bus availability and can sit in the buffer at peripheral A awaiting execution. Similarly, write transaction requests with a device attribute can be sent to device A and can be buffered provided the predefined value of outstanding transaction requests which is a function of the buffering capacity of the bus hasn't been reached. If there are any transaction requests awaiting execution in the buffer at slave B then this stalls the sending of read transaction requests to peripheral A and they must be queued in buffer 50 at output port 20 until a signal is received from peripheral B that all outstanding writes to this peripheral have completed. Similarly, reads to either A or B cannot be sent if they have a device attribute until all the writes to these devices have completed. Transaction requests with a device attribute to peripheral C can be transmitted independently of transaction requests to peripherals A and B with a device attribute. However, reads to device C will need to wait until any outstanding write transactions to device C have completed.

Any strongly ordered transaction requests will not be transmitted from output port 20 until all of the buffers have drained and all of the previously outstanding transactions have completed.

Figure 6:
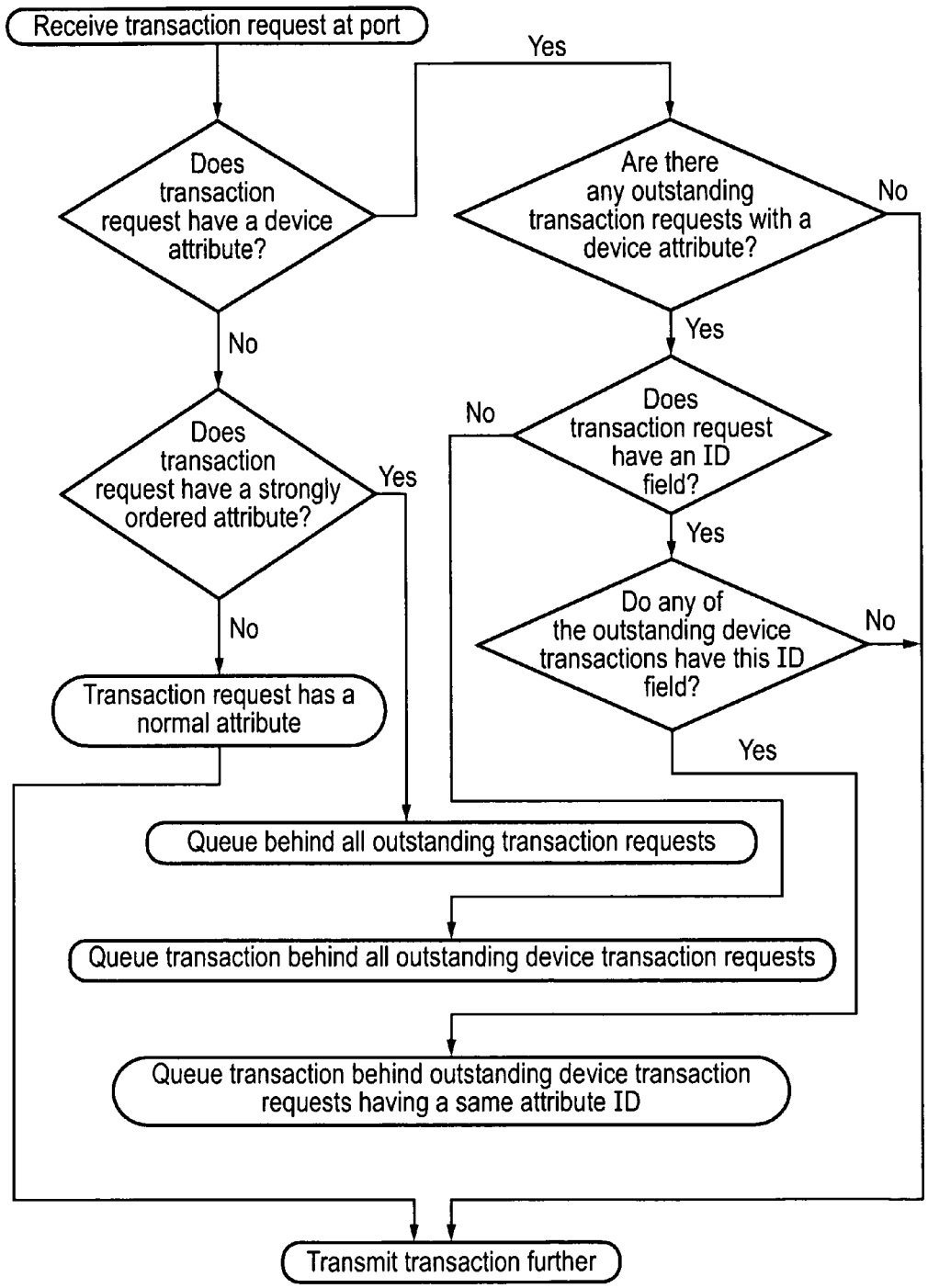
FIG. 6 shows a flow diagram illustrating steps in a method according to an example embodiment.

FIG. 6 shows a flow diagram illustrating a method according to an example embodiment. Initially a transaction request is received at the output port. It is determined if this transaction request has a device attribute. If it does it is determined if there are any outstanding transactions requests with a device attribute. Outstanding transaction requests are those that have been received at the output port but have not yet completed, i.e. a response signal from their destination device has not yet been received.

If there are outstanding transaction requests with a device attribute it is determined if the transaction request has an ID field. If it does then it is determined if any of the outstanding transaction requests have the same ID field. If there are no outstanding transactions with this ID field then the transaction request is transmitted further. If there are other transaction requests with this ID field then this transaction request is queued behind those transaction requests.

If there are no outstanding transaction requests with a device attribute then the transaction request is transmitted further, i.e. it is transmitted to the output of the port where it is then sent along the bus when the bus has availability.

If the transaction request does not have an ID field and there are outstanding transaction requests with a device attribute then this transaction request is queued behind all outstanding device transaction requests. In some embodiments, it may be that some devices are not within subsets and are dependent on all the transactions requests of the other devices. In this case they are not given an ID field and are queued behind all device transactions. If a system supported this, then in the embodiment of FIG. 3 an additional queue would be required behind the subset devices queues, and this queue would need the two subset devices queues to drain before it could transmit a transaction request to the bus.

If the transaction request does not have a device attribute it is determined if it has a strongly ordered attribute. If it does then it is queued behind all outstanding transaction requests and in some embodiments no further requests are accepted at the output port until this strongly ordered request has completed. In other embodiments there is buffering behind receipt of this strongly ordered request but the buffering is such that no transaction is issued from the output port until the strongly ordered transaction request has completed.

If the transaction request does not have a device attribute or a strongly ordered attribute then it will have a normal attribute and this is transmitted further as soon as there is bus availability. That is to say it is sent to the normal queue and is output when there is bus availability.

Although illustrative example embodiments have been described in detail herein with reference to the accompanying drawings, it is to be understood that the claims are not limited to those precise embodiments, and that various changes and modifications can be effected therein by one skilled in the art without departing from the scope and spirit of the appended claims.

We claim:

1. A data processing apparatus for processing data, said data processing apparatus being configured to communicate via an output port with a plurality of devices and to issue a stream of transaction requests to said output port, said stream of transaction requests comprising at least some device transaction requests destined for said plurality of devices, device transactions being transactions that may affect each other and therefore should be completed in an order in which they are received at said output port, said output port being configured to output said received transaction requests as a single serial stream of transaction requests, said data processing apparatus comprising:
   a destination device detector for monitoring said device transaction requests and for determining which of said plurality of devices each of said device transaction requests are destined for;
   said output port comprising ordering circuitry configured to treat said plurality of devices as at least two subsets of devices, at least one of said subsets comprising at least two devices;
   wherein the devices in one of said two subsets have longer latency times when compared to a latency time of at least one of the devices in the other one of said two subsets;
   said ordering circuitry being configured to receive said stream of transaction requests and to classify each of said device transaction requests into one of said at least two subsets in response to determination of a destination device by said destination device detector, and to maintain said order that said device transaction requests within each subset are received in, such that device transaction requests within each subset are output by said output port and executed by their respective destination devices in said received order, while device transaction requests within different subsets may be output in an order that is different to said received order.

2. A data processing apparatus according to claim 1, wherein said destination device detector is configured to detect said destination of said device transaction request from an address associated with said request, each of said at least two subsets being identified by a plurality of addresses.

3. A data processing apparatus according to claim 1, wherein said output port communicates with said plurality of devices via a bus configured to transmit transaction requests one after the other in series.

4. A data processing apparatus according to claim 1, wherein said device transaction requests each comprise a device indicator indicating that said transaction request is one of said device transaction requests, said destination device detector being configured to classify said device transaction requests into said at least two subsets and to add a further indicator to said device transaction request identifying said subset, said ordering circuitry being configured to maintain an ordering of said device transaction requests within said subsets.

5. A data processing apparatus according to claim 1, wherein said transaction requests each comprise an attribute indicator, said attribute indicator comprising one of the following:
   a normal indicator indicating said transaction request has no ordering requirements with respect to other transaction requests;
   a strongly ordered indicator indicating said transaction request has ordering requirements with respect to all transaction requests; and
   a device indicator indicating that said transaction request is one of said device transaction requests to one of said plurality of devices and that said device transaction request has ordering requirements with respect to other device transaction requests;
   said ordering circuitry being responsive to detection of said device transaction requests to classify said device transaction requests into said at least two subsets and to maintain said ordering within said subsets.

6. A data processing apparatus according to claim 1, wherein said ordering circuitry comprises buffer circuitry for storing pending transaction requests prior to outputting said transaction requests at said output port.

7. A data processing apparatus according to claim 6, wherein said buffer circuitry comprises a plurality of buffers arranged in parallel with each other, at least two of said plurality of buffers being configured to store pending transaction requests from corresponding ones of said at least two subsets of device transactions.

8. A data processing apparatus according to claim 6, comprising a counter associated with said buffer circuitry for storing a count indicating a number of stored pending transaction requests, said data processing apparatus being responsive to said count reaching a predetermined value to not transmit further transaction requests to said buffer circuitry.

9. A data processing apparatus according to claim 1, wherein said plurality of devices comprise at least two of: at least one memory, at least one peripheral device and at least one interrupt controller; and
   said at least one peripheral and said at least one interrupt controller are within different subsets.

10. A data processing apparatus according to claim 1, wherein said plurality of devices are devices that are mapped to a memory region dedicated to said plurality of devices.

11. A data processing apparatus according to claim 10, wherein each subset of devices comprise devices that have been configured to act independently to devices in other subsets.

12. A system comprising;
   a data processing apparatus for processing data, said data processing apparatus being configured to communicate via an output port with a plurality of devices and to issue a stream of transaction requests to said output port, said stream of transaction requests comprising at least some device transaction requests destined for said plurality of devices, device transactions being transactions that may affect each other and therefore should be completed in an order in which they are received at said output port, said output port being configured to output said received transaction requests as a single serial stream of transaction requests, said data processing apparatus comprising:
   a destination device detector for monitoring said device transaction requests and for determining which of said plurality of devices each of said device transaction requests are destined for;
   said output port comprising ordering circuitry configured to treat said plurality of devices as at least two subsets of devices, at least one of said subsets comprising at least two devices;
   said ordering circuitry being configured to receive said stream of transaction requests and to classify each of said device transaction requests into one of said at least two subsets in response to determination of a destination device by said destination device detector, and to maintain said order that said device transaction requests within each subset are received in, such that device transaction requests within each subset are output by said output port and executed by their respective destination devices in said received order, while device transaction requests within different subsets may be output in an order that is different to said received order, a plurality of devices and interconnect circuitry for providing data paths between said data processing apparatus and said plurality of devices.

13. A method of routing transaction requests generated by a data processing apparatus to a plurality of devices, said transaction requests being output from said data processing apparatus via an output port, said output port being for outputting a single serial stream of transaction requests, said method comprising the steps of:

issuing a stream of transaction requests generated by said data processing apparatus to said output port said stream of transaction requests comprising at least some device transaction requests destined for said plurality of devices, device transactions being transactions that may affect each other and therefore should be completed in an order in which they are received at said output port;

monitoring said device transaction requests using a destination device detector and determining which of said plurality of devices each of said device transaction requests are destined for;

ordering said transaction requests using ordering circuitry configured to treat said plurality of devices as at least two subsets of devices, at least one of said subsets comprising at least two devices, by classifying each of said device transaction requests into one of said at least two subsets in response to said determining step and maintaining said order that said device transaction requests within each subset are received in, such that device transaction requests within each subset are output by said output port and executed by their respective destination devices in said received order, while device transaction requests within different subsets may be output in an order that is different to said received order;

wherein the devices in one of said two subsets have longer latency times when compared to a latency time of at least one of the devices in the other one of said two subsets; and outputting said transaction requests as a single serial stream of transaction requests at said output port.

14. A method according to claim 13, wherein said step of determining which of said plurality of devices each of said device transaction requests are destined for, comprises detecting said destination of said device transaction request from an address associated with said request, each of said at least two subsets being identified by a plurality of addresses.

15. A method according to claim 13, wherein said step of classifying each of said device transaction requests that are identified as device transaction requests by device indicators into one of said at least two subsets, comprises amending said transaction request to comprise a further indicator in addition to said device indicator, said further indicator indicating that said transaction request belongs to one of said at least two subsets.

16. A method according to claim 13, wherein said transaction requests each comprise an attribute indicator, said attribute indicator comprising one of the following:

a normal indicator indicating said transaction request has no ordering requirements with respect to other transaction requests;

a strongly ordered indicator indicating said transaction request has ordering requirements with respect to all transaction requests; and a device indicator indicating that said transaction request is one of said device transaction requests to one of said plurality of devices and that said device transaction request has ordering requirements with respect to other device transaction requests;

said step of ordering being responsive to detection of said device transaction requests to classify said device transaction requests into said at least two subsets and to maintain said ordering within said subsets.

17. A method according to claim 13, comprising a further step of storing pending transaction requests prior in buffer circuitry to outputting said transaction requests at said output port.

18. A method according to claim 17, wherein said step of storing pending transaction requests comprises storing pending transaction requests from one of said at least two subsets of device transactions in a corresponding one of at least two buffers arranged in parallel with each other within said buffer circuitry.

19. A method according to claim 17, wherein said step of storing pending transaction requests, further comprises storing a count indicating a number of stored pending transaction requests in a counter associated with said buffer circuitry, said data processing apparatus being responsive to said count reaching a predetermined value to not transmit further transaction requests to said buffer circuitry.

20. Data processing means for processing data, said data processing means being configured to communicate with a plurality of devices via an output means for outputting transaction requests as a single serial stream, and to issue a stream of transaction requests to said output means, said stream of transaction requests comprising at least some device transaction requests destined for said plurality of devices, device transactions being transactions that may affect each other and therefore should be completed in an order in which they are received at said output means, said data processing means comprising:

a destination device detecting means for monitoring said device transaction requests and for determining which of said plurality of devices each of said device transaction requests are destined for;

said output means comprising ordering means configured to treat said plurality of devices as at least two subsets of devices, at least one of said subsets comprising at least two devices;

said ordering means being configured to receive said stream of transaction requests and to classify each of said device transaction requests into one of said at least two subsets in response to determination of a destination device by said destination device detecting means, and to maintain said order that said device transaction requests within each subset are received in, such that device transaction requests within each subset are output by said output means and executed by their respective destination devices in said received order, while device transaction requests within different subsets may be output in an order that is different to said received order and wherein the devices in one of said two subsets have longer latency times when compared to a latency time of at least one of the devices in the other one of said two subsets.

* * * * *